United States Patent
Yang et al.

(10) Patent No.: US 12,284,109 B2
(45) Date of Patent: Apr. 22, 2025

(54) DEVICE AND METHOD OF HANDLING DATA FLOW

(71) Applicant: Moxa Inc., New Taipei (TW)

(72) Inventors: Zhi-Jie Yang, New Taipei (TW); Hsi-Chin Wu, New Taipei (TW); Yu-Tzu Chang, New Taipei (TW); Chuan Huang, New Taipei (TW)

(73) Assignee: Moxa Inc., New Taipei (TW)

( * ) Notice: Subject to any disclaimer, the term of this patent is extended or adjusted under 35 U.S.C. 154(b) by 215 days.

(21) Appl. No.: 17/502,050

(22) Filed: Oct. 15, 2021

(65) Prior Publication Data
US 2023/0070205 A1    Mar. 9, 2023

(30) Foreign Application Priority Data
Sep. 7, 2021   (TW) .................................. 110133228

(51) Int. Cl.
*H04L 45/122*  (2022.01)
*H04B 3/54*    (2006.01)

(52) U.S. Cl.
CPC ........... *H04L 45/122* (2013.01); *H04B 3/542* (2013.01)

(58) Field of Classification Search
CPC .................................. H04L 45/00; H04B 3/00
See application file for complete search history.

(56) References Cited

U.S. PATENT DOCUMENTS

2009/0168645 A1*  7/2009  Tester .................... H04L 47/10
                                                         370/252

2012/0063354 A1*  3/2012  Vanga ................ H04L 41/0816
                                                         370/254

(Continued)

FOREIGN PATENT DOCUMENTS

CN    103326469 B    2/2015
CN    105426623 A    3/2016

(Continued)

OTHER PUBLICATIONS

Erwin Alexander Leal et al., Software defined power substations: An architecture for network communications and its control plane, 2016, IEEE, XP033040640.

(Continued)

*Primary Examiner* — Siming Liu
(74) *Attorney, Agent, or Firm* — Winston Hsu (57) ABSTRACT

A network managing device for handling a data flow comprises a topology generating module, for generating a topology of at least one device of a network, and for determining at least one intelligent electric device (IED) of the at least one device according to the topology; a transmitting module, coupled to the topology generating module, for transmitting a request to a reception-transmission device, wherein the request is for requesting a substation information associated with the at least one IED; a receiving module, coupled to the transmitting module, for receiving the substation information from the reception-transmission device; a shortest path generating module, coupled to the receiving module, for generating a first shortest path of the at least one IED according to the substation information; and a data flow processing module, coupled to the shortest path generating module, for generating a data flow according to the first shortest path.

14 Claims, 5 Drawing Sheets

(56) References Cited

U.S. PATENT DOCUMENTS

| | | | |
|---|---|---|---|
| 2012/0099478 A1 | 4/2012 | Fu | |
| 2013/0268196 A1* | 10/2013 | Dam | G01W 1/10 |
| | | | 702/3 |
| 2014/0282021 A1* | 9/2014 | Dolezilek | H02J 13/00034 |
| | | | 715/735 |
| 2015/0074260 A1 | 3/2015 | Anand B.S. | |
| 2017/0026243 A1* | 1/2017 | Berner | H04L 41/12 |
| 2017/0041269 A1* | 2/2017 | Eger | H04L 49/201 |
| 2022/0060383 A1* | 2/2022 | Zhang | G05B 19/042 |

FOREIGN PATENT DOCUMENTS

| | | |
|---|---|---|
| TW | 200952427 A1 | 12/2009 |
| WO | 2018/100509 A1 | 6/2018 |

OTHER PUBLICATIONS

Ai Zheng et al., Congestion Response Cost Assessment of Process-layer Network in Smart Substation, 2019, pp. 1-5, IEEE, XP033699388.

* cited by examiner

DEVICE AND METHOD OF HANDLING DATA FLOW

CROSS REFERENCE TO RELATED APPLICATION

This application claims priority of Taiwan Application No. 110133228 filed on Sep. 7, 2021, which is incorporated herein by reference.

BACKGROUND OF THE INVENTION

1. Field of the Invention

The present invention relates to a device and a method used in a communication system, and more particularly, to a device and a method of handling a data flow.

2. Description of the Prior Art

In a network, a user may obtain point-to-point connection relationships between devices according to data communicated between the devices. However, the user cannot obtain information of data flows of communication between the devices according to the point-to-point connection relationships between the devices.

The user cannot obtain whether an abnormal state of the network occurs and locations of the devices where the abnormal state of the network occurs according to the information of the data flows, when the devices cannot receive data normally. In this situation, the problem that the devices cannot receive the data normally cannot be solved. Costs (e.g., resources) of the communication between the devices are increased accordingly, and reliability of the communication between the devices is reduced accordingly.

Thus, how to handle a data flow is an important problem to be solved.

SUMMARY OF THE INVENTION

The present invention therefore provides a device and a method of handling a data flow, to solve the abovementioned problem.

A network managing device for handling a data flow, comprising: a topology generating module, for generating a topology of at least one device of a network, and for determining at least one intelligent electric device (IED) of the at least one device according to the topology; a transmitting module, coupled to the topology generating module, for transmitting a request to a reception-transmission device, wherein the request is for requesting a substation information associated with the at least one IED; a receiving module, coupled to the transmitting module, for receiving the substation information from the reception-transmission device; a shortest path generating module, coupled to the receiving module, for generating a first shortest path of the at least one IED according to the substation information; and a data flow processing module, coupled to the shortest path generating module, for generating a data flow according to the first shortest path.

A reception-transmission device for handling a data flow, comprising: a receiving module, for receiving a request of a network managing device, wherein the request is for requesting a substation information associated with at least one intelligent electric device (IED); and a transmitting module, coupled to the receiving module, for transmitting the substation information to the network managing device, wherein the network managing device generates a data flow of the at least one IED according to the substation information.

A network managing method for handling a data flow, comprising: generating a topology of at least one device of a network, and determining at least one intelligent electric device (IED) of the at least one device according to the topology; transmitting a request to a reception-transmission device, wherein the request is for requesting a substation information associated with the at least one IED; receiving the substation information from the reception-transmission device; generating a first shortest path of the at least one IED according to the substation information; and generating a data flow according to the first shortest path.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
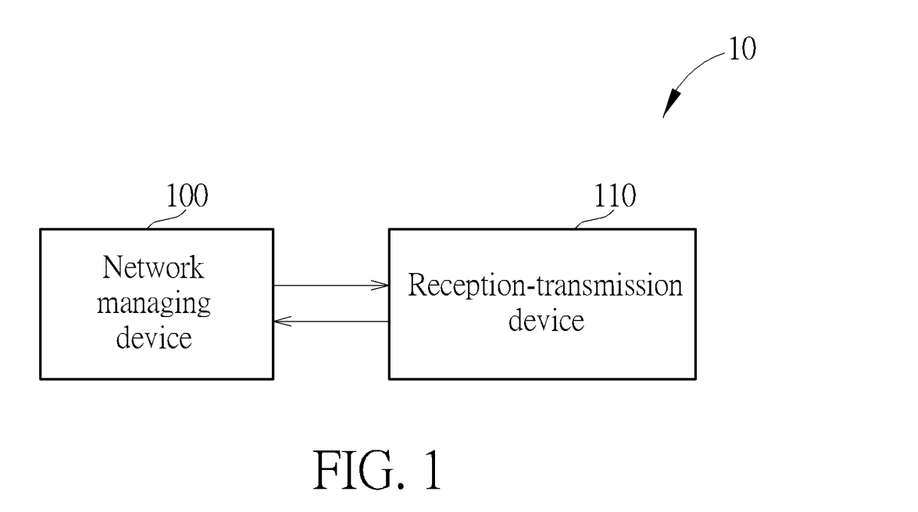
FIG. 1 is a schematic diagram of a network according to an example of the present invention.

FIG. 1 is a schematic diagram of a network 10 according to an example of the present invention. The network 10 is briefly composed of a network managing device 100 and a reception-transmission device 110. In FIG. 1, the network managing device 100 and the reception-transmission device 110 are simply utilized for illustrating the structure of the network 10. Practically, the network 10 may include (e.g., be) a power network (e.g., electric grid or electric network), which may support communication protocol standards for the power network (e.g., substation intelligent electric device (IED) communication protocol standards (e.g., IEC 61850 and/or later standards)). The power network may include a substation Level, a bay level and a process level. The network management device 100 may be a device for controlling other devices in a network (e.g., the substation level of the power network). The reception-transmission device 110 may be a device for receiving and transmitting (e.g., forwarding) data (e.g., packet(s)) in the network (e.g., the bay level or the process level of the power network). For example, the reception-transmission device 110 may be a switch, a router, an intrusion prevention system (IPS), an intrusion detection system (IDS), other suitable device (e.g., a device including functions of the above-mentioned devices) or a combination of the above-mentioned devices, and is not limited herein. In one example, the network management device 100 and the reception-transmission device 110 may communicate with each other via communication ways established by the communication protocol standards for the power network (e.g., generic object oriented substation event (GOOSE) messages or interfaces, client/server messages or interfaces and/or sampled values (SV) messages or interfaces).

Figure 2:
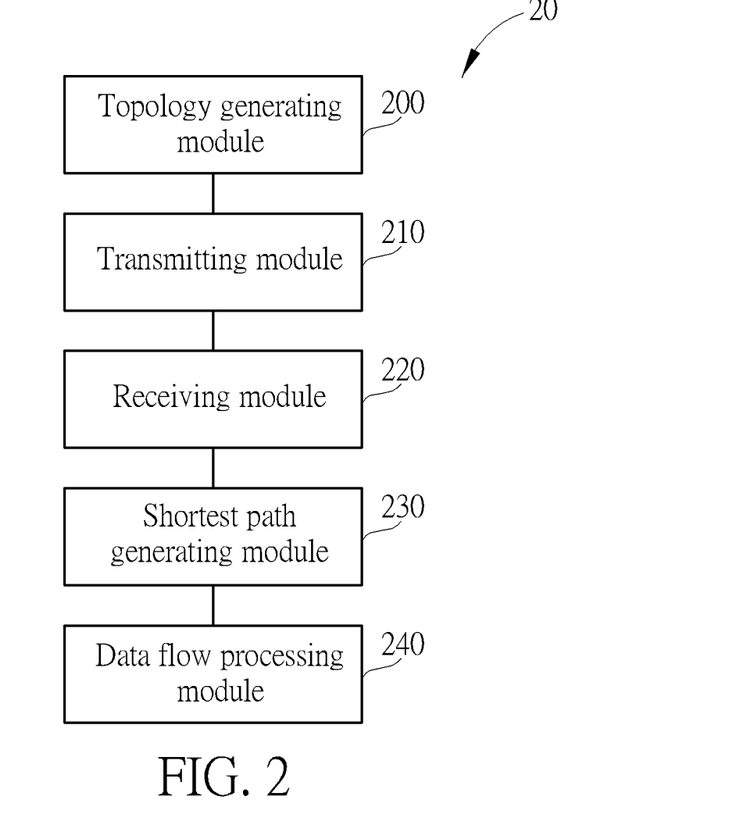
FIG. 2 is a schematic diagram of a network managing device according to an example of the present invention.

FIG. 2 is a schematic diagram of a network managing device 20 according to an example of the present invention, and may be used in the network managing device 100 in FIG. 1, for handling a data flow. As shown in FIG. 2, the network managing device 20 may include a topology generating module 200, a transmitting module 210, a receiving module 220, a shortest path generating module 230 and a data flow processing module 240. The topology generating module 200 may be for generating (e.g., calculating or computing) a topology of at least one device of a network, and may be for determining (e.g., calculating or computing) at least one IED of the at least one device according to the topology. The transmitting module 210 may be coupled to the topology generating module 200, and may be for transmitting a request to a reception-transmission device (e.g., the reception-transmission device 110 in FIG. 1). The request may be for requesting a substation information associated with the at least one IED. The receiving module 220 may be coupled to the transmitting module 210, and may be for receiving the substation information from the reception-transmission device. The shortest path generating module 230 may be coupled to the receiving module 220, and may be for generating a first shortest path of the at least one IED according to the substation information. The data flow processing module 240 may be coupled to the shortest path generating module 230, and may be for generating a data flow according to the first shortest path.

In one example, the network managing device 20 may include a scanning module. The scanning module may be coupled to the topology generating module 200, and may be for scanning the at least one device of the network (e.g., the network 10 in FIG. 1). That is, the scanning module may scan the network, and may transmit the scanned information (e.g., identity (ID), location (e.g., internet protocol address (IP Address) or media access control address (MAC Address)) of the at least one device to the topology generating module 200. The topology generating module 200 may generate (the topology of the at least one device of the network according to the scanned information of the at least one device.

In one example, the topology generating module 200 or the data flow processing module 240 may display the topology on a display device. In one example, the operation of the topology generating module 200 determining the at least one IED of the at least one device according to the topology may include: the topology generating module 200 may determine (e.g., identify or compare) the at least one IED of the at least one device of the topology according to (e.g., by using or importing) a substation configuration description (SCD) file. In one example, the SCD file may include a substation configuration, connection relationships between the at least one IED or communication ways between the at least one IED.

In one example, the substation information may include a GOOSE information. In one example, the GOOSE information may include a GOOSE table. In one example, the GOOSE table may be for recording or displaying (e.g., listing) GOOSE message(s), identify(ies) of the GOOSE message(s) or status(es) of the GOOSE message(s) (e.g., normal, warning or error) of each of the at least one IED.

In one example, the operation of the shortest path generating module 230 generating the first shortest path of the at least one IED according to the substation information may include the following operations: (A) generating a second shortest path of the at least one IED according to a shortest path algorithm. (B) determining whether the second shortest path is correct according to the substation information. (C) determining the second shortest path to be the first shortest path to generate the first shortest path, when the second shortest path is correct. (D) returning to the operation (A) until determining that the second shortest path is correct, when the second shortest path is incorrect.

In one example, the shortest path generating module 230 may determine whether the second shortest path includes a redundant path, between the operations (A) and (B). The shortest path generating module 230 may perform (e.g., continue performing) the operation (B), when the shortest path generating module 230 determines that the second shortest path does not include the redundant path. The shortest path generating module 230 may handle the redundant path of the second shortest path (e.g., search for a high availability seamless redundancy (HSR) path in the second shortest path) and perform (e.g., continue performing) the operation (B), when the shortest path generating module 230 determines that the second shortest path includes the redundant path.

In one example, the shortest path algorithm may include a Dijkstra's algorithm, and is not limited herein.

In one example, the data flow processing module 240 may display at least one information of following information of the data flow on the display device via the topology: a direction or a location where an event (e.g., abnormal, warning or error) occurs. In one example, the data flow processing module 240 may display a path where the data flow is prohibited from being transmitted on the display device via the topology.

Figure 3:
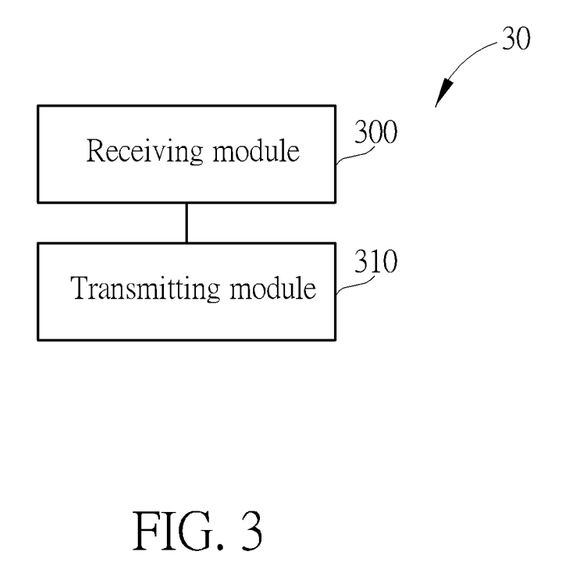
FIG. 3 is a schematic diagram of a reception-transmission device according to an example of the present invention.

FIG. 3 is a schematic diagram of a reception-transmission device 30 according to an example of the present invention, and may be used in the reception-transmission device 110 in FIG. 1, for handling a data flow. As shown in FIG. 3, the reception-transmission device 30 may include a receiving module 300 and a transmitting module 310. The receiving module 300 may be for receiving a request of a network managing device (e.g., the network managing device 100 in FIG. 1). The request may be for requesting a substation information associated with at least one IED. The transmitting module 310 may be coupled to the receiving module 300, and may be for transmitting the substation information to the network managing device. The network managing device may generate a data flow of the at least one IED according to the substation information.

In one example, the receiving module 300 may search for (e.g., retrieve) information associated with the request in a substation information database of the reception-transmission device 30, when receiving the request from the network management device (e.g., via an external access interface). In one example, the transmitting module 310 may transmit the information associated with the request to the network management device (e.g., via the external access interface), when the receiving module 300 finds the information associated with the request in the substation information database.

In one example, the transmitting module 310 may actively or periodically transmit the substation information associated with at least one IED to the network management device (e.g., via the external access interface). That is, the transmitting module 310 still may transmit the substation information associated with at least one IED to the network management device, when the transmitting module 310 does not receive the request from the network management device (e.g., via the external access interface).

In one example, the reception-transmission device 30 may receive data (e.g., packet(s)) in the network. In one example, the reception-transmission device 30 may determine (e.g., analyze) whether the data includes (e.g., is) substation information. In one example, the reception-transmission device 30 may store (e.g., update) the substation information into the substation information database of the reception-transmission device 30, when the reception-transmission device 30 determines that the data includes the substation information. The reception-transmission device 30 may perform an anomaly check on the data, and may store a result of the anomaly check (e.g., data status) into the substation information database of the reception-transmission device 30. In one example, the reception-transmission device 30 may not store any information associated with the data into the substation information database of the reception-transmission device 30, when the reception-transmission device 30 determines that the data does not include the substation information.

Figure 4:
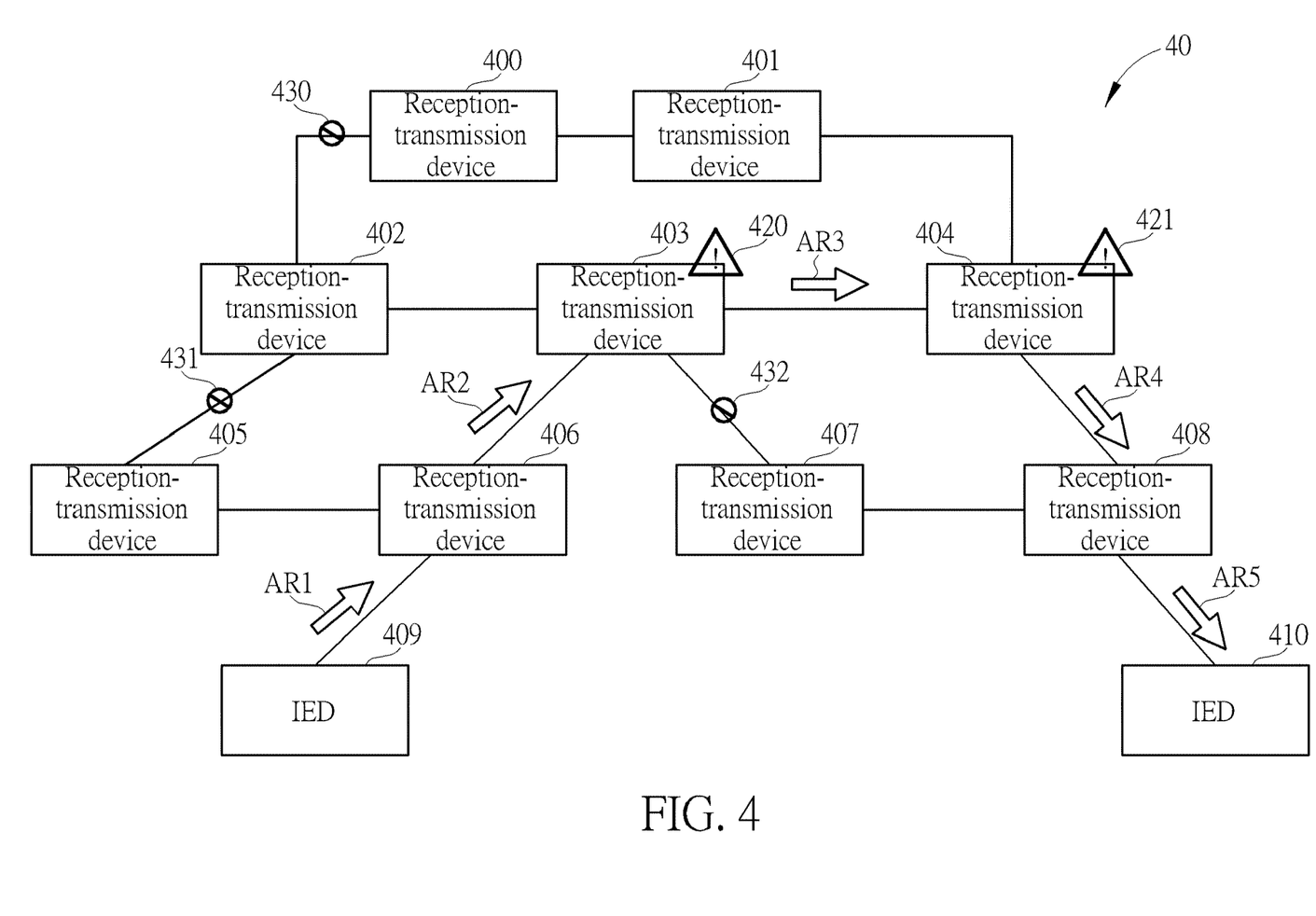
FIG. 4 is a schematic diagram of a display device displaying a topology according to an example of the present invention.

FIG. 4 is a schematic diagram of a display device displaying a topology 40 according to an example of the present invention. FIG. 4 may be used in the topology generating module 200 or the data flow processing module 240 in FIG. 2 for displaying a topology, and may be used in the data flow processing module 240 in FIG. 2, for displaying a data flow. As shown in FIG. 4, the topology 40 may include reception-transmission devices 400-408 and IEDs 409-410. The IED 409 may be connected to the reception-transmission device 406 and may be for publishing data, and the IED 410 may be connected to the reception-transmission device 408 and may be for subscribing data. In one example, the data flow processing module 240 may display a direction of the data flow on the display device via the topology 40. For example, the direction of the data flow may be a direction formed by the IED 409, an arrow AR1, the reception-transmission device 406, an arrow AR2, the reception-transmission device 403, an arrow AR3, the reception-transmission device 404, an arrow AR4, the reception-transmission device 408, an arrow AR5 and the IED 410. Thus, a user may obtain the direction of the data flow. This example is only an embodiment of the present invention, and is not limited herein. In one example, the data flow processing module 240 may display location(s) where event(s) (e.g., abnormal, warning or error) of the data flow occurs on the display device via the topology 40. For example, displaying a warning sign 420 on the reception-transmission device 403 and displaying a warning sign 421 on the reception-transmission device 404. Thus, the user may obtain that the locations where the events of the data flow occur are the reception-transmission device 403 and the reception-transmission device 404. This example is only an embodiment of the present invention, and is not limited herein.

In one example, the data flow processing module 240 may display path(s) where the data flow is prohibited from being transmitted on the display device via the topology 40. For example, displaying a prohibition sign 430 on a path between the reception-transmission device 400 and the reception-transmission device 402, displaying a prohibition sign 431 on a path between the reception-transmission device 402 and the reception-transmission device 405 or displaying a prohibition sign 432 on a path between the reception-transmission device 403 and the reception-transmission device 407. Thus, the user may obtain that the paths where the data flow are prohibited from being transmitted are the path between the reception-transmission device 400 and the reception-transmission device 402, the path between the reception-transmission device 402 and the reception-transmission device 405 or the path between the reception-transmission device 403 and the reception-transmission device 407. This example is only an embodiment of the present invention, and is not limited herein.

Figure 5:
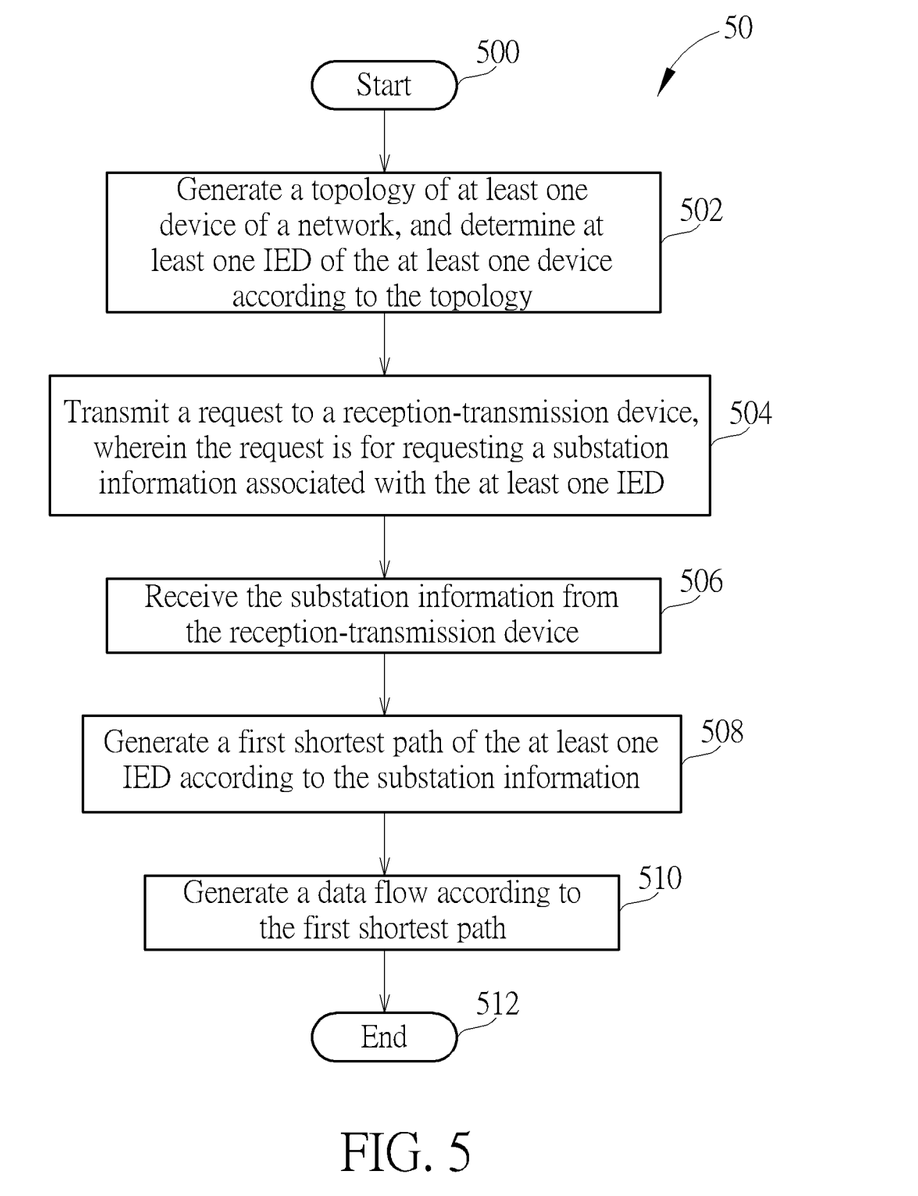
FIG. 5 is a flowchart of a process according to an example of the present invention.

Operations of the network managing device 20 in the above examples can be summarized into a process 50 shown in FIG. 5. The process 50 includes the following steps:
Step 500: Start.
Step 502: Generate a topology of at least one device of a network, and determining at least one IED of the at least one device according to the topology.
Step 504: Transmit a request to a reception-transmission device, wherein the request is for requesting a substation information associated with the at least one IED.
Step 506: Receive the substation information from the reception-transmission device.
Step 508: Generate a first shortest path of the at least one IED according to the substation information.
Step 510: Generate a data flow according to the first shortest path.
Step 512: End.

Figure 6:
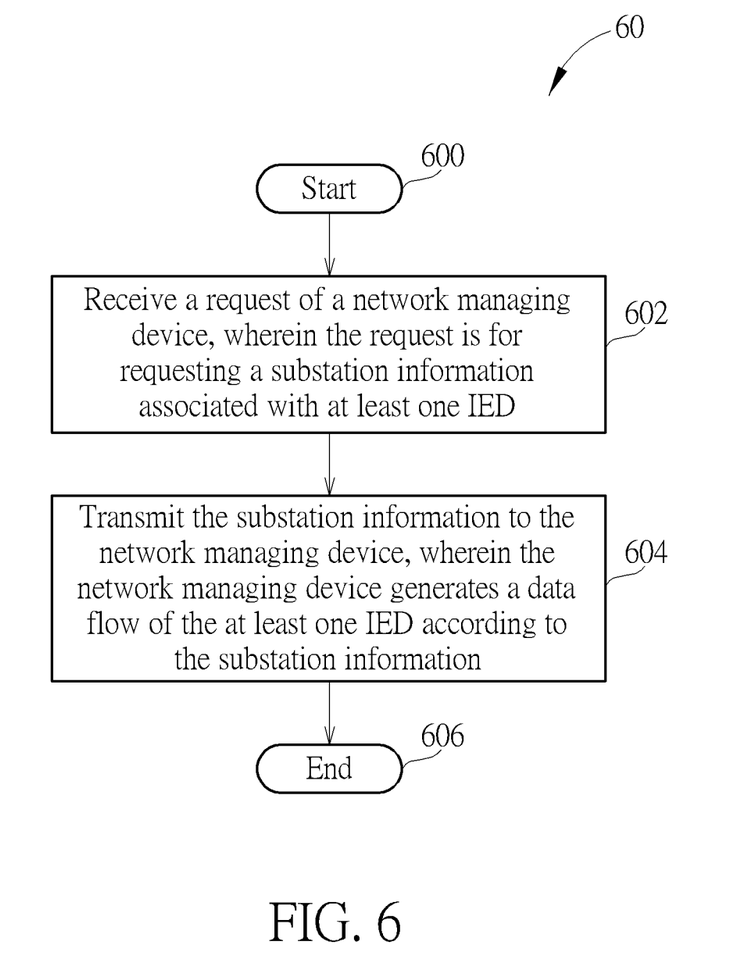
FIG. 6 is a flowchart of a process according to an example of the present invention.

Operations of the reception-transmission device 30 in the above examples can be summarized into a process 60 shown in FIG. 6. The process 60 includes the following steps:
Step 600: Start.
Step 602: Receive a request of a network managing device, wherein the request is for requesting a substation information associated with at least one IED.
Step 604: Transmit the substation information to the network managing device, wherein the network managing device generates a data flow of the at least one IED according to the substation information.
Step 606: End.

The above "first" and "second" are for distinguishing related terms, and are not for limiting the order of related terms. The above "determine" may be replaced by "generate", "obtain", "calculate" or "compute". The above "according to" may be replaced by "by using" or "via".

Those skilled in the art should readily make combinations, modifications and/or alterations on the abovementioned description and examples. The abovementioned generator, discriminator, description, functions, modules and/or processes including suggested steps can be realized by means that could be hardware, software, firmware (known as a combination of a hardware device and computer instructions and data that reside as read-only software on the hardware device), an electronic system, or combination thereof.

Realizations of the present invention may include the network managing device 20. The network managing device 20 (and the topology generating module 200, the transmitting module 210, the receiving module 220, the shortest path generating module 230 and the data flow processing module 240 of the network managing device 20) are various. For example, the devices mentioned above may be integrated into one or more devices. Realizations of the present invention may include the reception-transmission device 30. The reception-transmission device 30 (and the receiving module 300 and the transmitting module 310 of the reception-transmission device 30) are various. For example, the devices mentioned above may be integrated into one or more devices. Realizations of the present invention may include the network managing device 20 and the reception-transmission device 30.

Examples of the hardware may include analog circuit (s), digital circuit(s) and/or mixed circuit(s). For example, the hardware may include application-specific integrated circuit(s) (ASIC(s)), field programmable gate array(s) (FPGA(s)), programmable logic device(s), coupled hardware components or combination thereof. In one example, the hardware includes general-purpose processor(s), microprocessor(s), controller(s), digital signal processor(s) (DSP(s)) or combination thereof.

Examples of the software may include set(s) of codes, set(s) of instructions and/or set(s) of functions retained (e.g., stored) in a storage unit, e.g., a computer-readable medium. The computer-readable medium may include Subscriber Identity Module (SIM), Read-Only Memory (ROM), flash memory, Random Access Memory (RAM), CD-ROM/DVD-ROM/BD-ROM, magnetic tape, hard disk, optical data storage device, non-volatile storage unit, or combination thereof. The computer-readable medium (e.g., storage unit) may be coupled to at least one processor internally (e.g., integrated) or externally (e.g., separated). The at least one processor which may include one or more modules may (e.g., be configured to) execute the software in the computer-readable medium. The set(s) of codes, the set(s) of instructions and/or the set(s) of functions may cause the at least one processor, the module(s), the hardware and/or the electronic system to perform the related steps.

To sum up, the present invention provides a device and a method of handling a data flow. The user may obtain whether the abnormal state of the network occurs and locations of the devices where the abnormal state of the network occurs via generating the data flow between the devices and displaying the data flow. Thus, the problem that the devices cannot receive data normally can be solved. Costs (e.g., resources) of the communication between the devices are reduced, and reliability of the communication between the devices is improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A network managing device for handling a data flow, comprising:
    a topology generating module, for generating a topology of at least one device of a network, and for determining at least one intelligent electric device (IED) of the at least one device according to the topology;
    a transmitting module, coupled to the topology generating module, for transmitting a request to a reception-transmission device, wherein the request is for requesting a substation information associated with the at least one IED;
    a receiving module, coupled to the transmitting module, for receiving the substation information from the reception-transmission device;
    a shortest path generating module, coupled to the receiving module, for generating a first shortest path of the at least one IED according to the substation information; and
    a data flow processing module, coupled to the shortest path generating module, for generating a data flow according to the first shortest path, and displaying at least one information of following information of the data flow on a display device via the topology: a direction or a location where an event occurs.

2. The network managing device of claim 1, further comprising:
    a scanning module, coupled to the topology generating module, for scanning the at least one device of the network.

3. The network managing device of claim 1, wherein the network comprises a power network.

4. The network managing device of claim 1, wherein the operation of determining the at least one IED according to the topology comprises:
    determining the at least one IED of the topology according to a substation configuration description (SCD) file.

5. The network managing device of claim 1, wherein the substation information comprises a generic object oriented substation event (GOOSE) information.

6. The network managing device of claim 1, wherein the operation of generating the first shortest path of the at least one IED according to the substation information comprises:
    (A) generating a second shortest path of the at least one IED according to a shortest path algorithm;
    (B) determining whether the second shortest path is correct according to the substation information;
    (C) determining the second shortest path to be the first shortest path to generate the first shortest path, when the second shortest path is correct; and
    (D) returning to the operation (A) until determining that the second shortest path is correct, when the second shortest path is incorrect.

7. The network managing device of claim 6, wherein the shortest path algorithm comprises a Dijkstra's algorithm.

8. A network managing method for handling a data flow, comprising:
    generating a topology of at least one device of a network, and determining at least one intelligent electric device (IED) of the at least one device according to the topology;
    transmitting a request to a reception-transmission device, wherein the request is for requesting a substation information associated with the at least one IED;
    receiving the substation information from the reception-transmission device;
    generating a first shortest path of the at least one IED according to the substation information; and
    generating a data flow according to the first shortest path;
    displaying at least one information of following information of the data flow on a display device via the topology: a direction or a location where an event occurs.

9. The network managing method of claim 8, further comprising:
    scanning the at least one device of the network.

10. The network managing method of claim 8, wherein the network comprises a power network.

11. The network managing method of claim 8, wherein the operation of determining the at least one IED according to the topology comprises:
    determining the at least one IED of the topology according to a substation configuration description (SCD) file.

12. The network managing method of claim 8, wherein the substation information comprises a generic object oriented substation event (GOOSE) information.

13. The network managing method of claim 8, wherein the operation of generating the first shortest path of the at least one IED according to the substation information comprises:
    (A) generating a second shortest path of the at least one IED according to a shortest path algorithm;
    (B) determining whether the second shortest path is correct according to the substation information;

(C) determining the second shortest path to be the first shortest path to generate the first shortest path, when the second shortest path is correct; and (D) returning to the operation (A) until determining that the second shortest path is correct, when the second shortest path is incorrect.

14. The network managing method of claim 13, wherein the shortest path algorithm comprises a Dijkstra's algorithm.

* * * * *